US011141719B2

(12) United States Patent
Brammer et al.

(10) Patent No.: US 11,141,719 B2
(45) Date of Patent: Oct. 12, 2021

(54) METHODS OF TREATING A HYDROFORMYLATION CATALYST SOLUTION

(71) Applicant: Dow Technology Investments LLC, Midland, MI (US)

(72) Inventors: Michael A. Brammer, Freeport, TX (US); Marinus A. Bigi, Freeport, TX (US); Rick B. Watson, Missouri City, TX (US)

(73) Assignee: Dow Technology Investments LLC, Midland, MI (US)

( * ) Notice: Subject to any disclaimer, the term of this patent is extended or adjusted under 35 U.S.C. 154(b) by 238 days.

(21) Appl. No.: 16/340,772

(22) PCT Filed: Nov. 6, 2017

(86) PCT No.: PCT/US2017/060094
§ 371 (c)(1),
(2) Date: Apr. 10, 2019

(87) PCT Pub. No.: WO2018/089285
PCT Pub. Date: May 17, 2018

(65) Prior Publication Data
US 2020/0047172 A1    Feb. 13, 2020

Related U.S. Application Data

(60) Provisional application No. 62/419,215, filed on Nov. 8, 2016.

(51) Int. Cl.
*C07C 45/50* (2006.01)
*B01J 31/40* (2006.01)
*B01J 31/18* (2006.01)

(52) U.S. Cl.
CPC ......... *B01J 31/4053* (2013.01); *B01J 31/186* (2013.01); *B01J 31/4046* (2013.01); *B01J 2231/321* (2013.01); *B01J 2531/822* (2013.01)

(58) Field of Classification Search
CPC ....... C07C 45/505; C07C 45/50; B01J 31/187
See application file for complete search history.

(56) References Cited

U.S. PATENT DOCUMENTS

| | | |
|---|---|---|
| 3,527,809 A | 9/1970 | Pruett et al. |
| 3,547,964 A | 12/1970 | Olivier |
| 4,021,463 A | 5/1977 | Kummer et al. |
| 4,113,754 A | 9/1978 | Kummer et al. |
| 4,148,830 A | 4/1979 | Pruett et al. |
| 4,196,096 A | 4/1980 | Dawes et al. |
| 4,221,743 A | 9/1980 | Halstead et al. |
| 4,247,486 A | 1/1981 | Brewester et al. |
| 4,277,627 A | 7/1981 | Bryant et al. |
| 4,297,239 A | 10/1981 | Bryant et al. |
| 4,329,507 A | 5/1982 | Takeda et al. |
| 4,374,278 A | 2/1983 | Bryant et al. |
| 4,400,547 A | 8/1983 | Dawes et al. |
| 4,518,809 A | 5/1985 | Forster et al. |
| 4,528,403 A | 7/1985 | Tano et al. |
| 4,537,997 A | 8/1985 | Kojima et al. |
| 4,605,780 A | 8/1986 | Billig et al. |
| 4,668,651 A | 5/1987 | Billig et al. |
| 4,774,361 A | 9/1988 | Maher et al. |
| 4,822,917 A | 4/1989 | Miyazawa et al. |
| 5,102,505 A | 4/1992 | Sorensen |
| 5,105,018 A | 4/1992 | Miyazawa et al. |
| 5,110,990 A | 5/1992 | Blessing et al. |
| 5,288,918 A | 2/1994 | Maher et al. |
| 5,312,996 A | 5/1994 | Packett |
| 5,360,938 A | 11/1994 | Babin et al. |
| 5,367,106 A | 11/1994 | Unruh et al. |
| 5,430,194 A | 7/1995 | Barner et al. |
| 5,491,266 A | 2/1996 | Babin et al. |
| 5,681,473 A | 10/1997 | Miller et al. |
| 5,728,893 A | 3/1998 | Becker et al. |
| 5,731,472 A | 3/1998 | Leung et al. |
| 5,874,640 A | 2/1999 | Bryant et al. |
| 5,929,289 A | 7/1999 | Abatjoglou et al. |
| 6,642,420 B1 | 11/2003 | Zehner et al. |
| 7,446,231 B2 | 11/2008 | Peterson et al. |
| 7,863,487 B2 | 1/2011 | Eisenschmid et al. |
| 8,389,774 B2 | 3/2013 | Becker et al. |
| 8,404,903 B2 | 3/2013 | Cox et al. |

(Continued)

FOREIGN PATENT DOCUMENTS

| | | |
|---|---|---|
| GB | 1338225 | 11/1973 |
| WO | 1988/08835 | 11/1988 |

(Continued)

OTHER PUBLICATIONS

C.K. Brown and G. Wilkinson, Journal of the Chemical Society, 1970, pp. 2753-2764.
M. Mo, et al., Catalysis Letters, 2011, vol. 142, No. 2, p. 238-242.
PCT/US2017/060094, International Preliminary Report on Patentability dated May 14, 2019.
PCT/US2017/060094, International Search Report and Written Opinion dated Jan. 31, 2018.
X. Jia, et al., Chemistry—A European Journal, 2012, pp. 15288-15295, vol. 18, No. 48.

*Primary Examiner* — Sikarl A Witherspoon

(57) ABSTRACT

Disclosed herein are methods of treating a hydroformylation catalyst solution wherein the solution comprises rhodium, polyphosphoramidite ligands, and polyphosphoramidite ligand degradation products and wherein the hydroformylation catalyst solution is used to hydroformylate an olefin in an operating hydroformylation unit. In some embodiments, such methods comprise contacting the catalyst solution with a peroxide in the operating hydroformylation unit.

11 Claims, No Drawings

(56) References Cited

U.S. PATENT DOCUMENTS 9,067,876 B2 6/2015 Becker et al.
2006/0224000 A1 10/2006 Papp et al.
2015/0328628 A1* 11/2015 Diebolt .................. C07C 45/50
548/402

FOREIGN PATENT DOCUMENTS

WO 2015/047723 4/2015
WO 2015/094781 6/2015

* cited by examiner

METHODS OF TREATING A HYDROFORMYLATION CATALYST SOLUTION

FIELD

The present disclosure relates generally to methods of treating hydroformylation catalyst solutions and in particular, to methods of treating hydroformylation catalyst solutions comprising polyphosphoramidite ligands.

BACKGROUND

Aldehydes can be prepared from olefins in a number of ways using hydroformylation. For example, olefins can be reacted with carbon monoxide and hydrogen in the presence of a polyphosphoramidite-modified rhodium catalyst to produce aldehydes containing three to twenty-one carbon atoms.

Although the root causes vary, a steady loss of catalyst activity over time is an issue with hydroformylation processes. For example, rhodium processes promoted by triphenylphosphine (TPP) are known to suffer intrinsic deactivation due to rhodium clustering and the formation of inhibitory phosphorous compounds (see, e.g., U.S. Pat. Nos. 4,277,627 and 4,605,780). Likewise, rhodium-bisphophite catalysts are inhibited by phosphorous-containing degradation products as detailed in U.S. Pat. No. 5,874,640. Thus, discovering and employing an effective strategy to mitigate catalyst deactivation is an important aspect of hydroformylation process development.

Rhodium-polyphosphoramidites are another type of hydroformylation catalyst where deactivation is an issue. There exists a need for a facile means to mitigate the loss of activity in a hydroformylation process comprising a rhodium-polyphosphoramidite catalyst.

SUMMARY

Disclosed in embodiments herein are methods to rejuvenate deactivated, or to prevent deactivation of, hydroformylation catalyst solutions. In some embodiments, the method is employed on a continuous basis to slow or mitigate catalyst deactivation.

In one embodiment, the present invention relates to a method of treating a hydroformylation catalyst solution comprising rhodium, polyphosphoramidite ligand, and polyphosphoramidite ligand degradation products, wherein the hydroformylation catalyst solution is used to hydroformylate an olefin in an operating hydroformylation unit, the method comprising contacting the catalyst solution with a peroxide in the operating hydroformylation unit. In some embodiments, additional polyphosphoramidite ligand can be added to the catalyst solution after the addition of peroxide. In some embodiments, the method is employed on a continuous basis, and extends the effective lifetime of the catalyst by slowing and/or preventing catalyst deactivation.

These and other embodiments are described in more detail in the Detailed Description.

DETAILED DESCRIPTION

The methods disclosed herein are particularly suitable for use in hydroformylation processes utilizing polyphosphoramidite ligands as part of the catalyst. Such hydroformylation processes comprise contacting CO, H2, and at least one olefin under hydroformylation conditions sufficient to form at least one aldehyde product in the presence of a catalyst comprising, as components, a transition metal and a polyphosphoramidite ligand.

All references to the Periodic Table of the Elements and the various groups therein are to the version published in the CRC Handbook of Chemistry and Physics, 72nd Ed. (1991-1992) CRC Press, at page I-11.

Unless stated to the contrary, or implicit from the context, all parts and percentages are based on weight and all test methods are current as of the filing date of this application. For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

As used herein, "a," "an," "the," "at least one," and "one or more" are used interchangeably. The terms "comprises," "includes," and variations thereof do not have a limiting meaning where these terms appear in the description and claims. Thus, for example, an aqueous composition that includes particles of "a" hydrophobic polymer can be interpreted to mean that the composition includes particles of "one or more" hydrophobic polymers.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc. Also herein, the recitations of numerical ranges and/or numerical values, including such recitations in the claims, can be read to include the term "about." In such instances the term "about" refers to numerical ranges and/or numerical values that are substantially the same as those recited herein.

As used herein, the term "ppmw" means parts per million by weight.

For purposes of this invention, pressures are expressed as pounds per square inch absolute (psia) unless otherwise noted.

For purposes of this invention, the term "hydrocarbon" is contemplated to include all permissible compounds having at least one hydrogen and one carbon atom. Such permissible compounds may also have one or more heteroatoms. In a broad aspect, the permissible hydrocarbons include acyclic (with or without heteroatoms) and cyclic, branched and unbranched, carbocyclic and heterocyclic, aromatic and nonaromatic organic compounds that can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxyalkyl, aminoalkyl, in which the number of carbons can range from 1 to 20 or more, preferably from 1 to 12, as well as hydroxy, halo, and amino. The permissible substituents can be one or more and the same or different for appropriate organic compounds. This invention is not intended to be limited in any manner by the permissible substituents of organic compounds.

As used herein, the term "hydroformylation" is contemplated to include, but not limited to, all permissible asymmetric and non-asymmetric hydroformylation processes that involve converting one or more substituted or unsubstituted olefinic compounds or a reaction mixture comprising one or more substituted or unsubstituted olefinic compounds to one or more substituted or unsubstituted aldehydes or a reaction mixture comprising one or more substituted or unsubstituted aldehydes.

The terms "reactor" and "reaction zone" are used interchangeably and are contemplated to comprise portions of the process where the elements of the hydroformylation reaction are present (olefin, syngas and catalyst), and thus hydroformylation may be proceeding. Examples include but are not limited to continuous stirred tank reactors (CSTR), as well as the piping that connects one reactor to another or one portion of the hydroformylation process to another (e.g. connecting a separation zone to a reactor).

The term "separation zone" is contemplated to comprise an area of the process where at least a portion of the product aldehyde is removed from the reaction fluid. In a preferred embodiment, the reaction fluid is passed through a zone of elevated temperature and the product aldehyde is volatilized overhead, condensed and collected. Such a separation zone is typically referred to as a "vaporizer", and may be operated at reduced pressure, or with a stream of flowing gas to assist in vaporization.

The terms "catalyst-containing liquid effluent" and "vaporizer tails' are used interchangeably herein, and refer to the liquid effluent from the vaporizer comprising residual product aldehyde, aldehyde condensation byproducts, the metal-polyphosphoramidite ligand catalyst, free polyphosphoramidite, and polyphosphoramidite decomposition products.

The terms "reaction fluid", "reaction medium", "process fluid" and "catalyst solution" are used interchangeably herein, and may include, but are not limited to, a mixture comprising: (a) a metal-polyphosphoramidite ligand complex catalyst, (b) free polyphosphoramidite ligand, (c) aldehyde product formed in the reaction, (d) unreacted reactants, (e) aldehyde condensation byproducts ("heavies"), (f) optionally a solvent for said metal-polyphosphoramidite ligand complex catalyst and said free polyphosphoramidite ligand, and, optionally, (g) one or more phosphorus acidic compounds formed in the reaction (which may be homogeneous or heterogeneous, and these compounds include those adhered to process equipment surfaces) and (h) polyphosphoramidite ligand decomposition products such as the corresponding oxide. The reaction fluid can encompass, but is not limited to, (a) a fluid in a reaction zone, (b) a fluid stream on its way to a separation zone, (c) a fluid in a separation zone, (d) a recycle stream, (e) a fluid withdrawn from a reaction zone or separation zone, (f) a withdrawn fluid being treated with an aqueous buffer solution, (g) a treated fluid returned to a reaction zone or separation zone, (h) a fluid in an external cooler, and (i) ligand decomposition products and their salts.

The terms "aldehyde product", "desired aldehyde product", "product aldehyde" and "product aldehyde(s)" are used interchangeably and are contemplated to include the aldehyde(s) produced on-purpose from the hydroformylation reaction. Examples of such product aldehydes include propionaldehyde (produced from ethylene), butyraldehyde (produced from propylene) and valeraldehyde (produced from 1-butene or mixed butenes).

The terms "ligand decomposition products" and "ligand degradation products' are used interchangeably herein and are contemplated to include, but not limited to, small phosphorous compounds produced by rhodium-catalyzed side reactions of the parent ligand, as well as partially oxidized polyphosphoramidite.

Disclosed herein are methods of treating a hydroformylation catalyst solution comprising rhodium, polyphosphoramidite ligand, and polyphosphoramidite ligand degradation products, wherein the hydroformylation catalyst solution is used to hydroformylate an olefin in an operating hydroformylation unit. In some embodiments, such methods comprise contacting the catalyst solution with a peroxide in the operating hydroformylation unit. As used herein, "contacting" includes, without limitation, adding, mixing, passing through a solution, or otherwise bringing into contact with.

In some embodiments, the hydroformylation catalyst solution further comprises at least one product aldehyde.

In some embodiments, the operating hydroformylation unit comprises a reaction zone, and contacting the catalyst solution with a peroxide comprises adding the peroxide to the reaction zone of the operating hydroformylation unit.

In some embodiments, contacting the catalyst solution with a peroxide comprises a) introducing a portion of the catalyst solution to a separation zone to provide a catalyst-containing effluent; and b) passing at least a portion of the catalyst-containing effluent from the separation zone through an extraction zone comprising an aqueous peroxide solution. In some embodiments, the separation zone comprises a vaporizer. Some embodiments further comprise returning the treated catalyst solution to a reaction zone in the operating hydroformylation unit.

In some embodiments, additional polyphosphoramidite ligand is added to the catalyst solution after the addition of peroxide.

In some embodiments, the hydroformylation catalyst solution is at a temperature of 60° C. or greater when contacted with the peroxide. The hydroformylation catalyst solution is at a temperature of 75° C. or greater when contacted with the peroxide in some embodiments.

The peroxide, in some embodiments, comprises hydrogen peroxide, peroxy esters, peroxydicarbonates, dialkyl peroxides, hydroperoxides, peroxyketals, or a combination thereof.

In some embodiments, the molar equivalent of peroxide is less than the molar equivalent of phosphorous when the deactivated hydroformylation catalyst solution is contacted with the peroxide.

Hydrogen and carbon monoxide may be obtained from any suitable source, including petroleum cracking and refinery operations. Syngas mixtures are a preferred source of hydrogen and CO.

Syngas (from synthesis gas) is the name given to a gas mixture that contains varying amounts of CO and $H_2$. Production methods are well known. Hydrogen and CO typically are the main components of syngas, but syngas may contain $CO_2$ and inert gases such as $N_2$ and Ar. The molar ratio of $H_2$ to CO varies greatly but generally ranges from 1:100 to 100:1 and preferably between 1:10 and 10:1. Syngas is commercially available and is often used as a fuel source or as an intermediate for the production of other chemicals. The most preferred $H_2$:CO molar ratio for chemical production is between 3:1 and 1:3 and usually is targeted to be between about 1:2 and 2:1 for most hydroformylation applications.

As used herein, "peroxides" include hydrogen peroxide, organic peroxides, and mixtures thereof. Peroxides are contemplated to comprise hydrogen peroxide, as well as organic compounds containing at least one peroxide group (ROOR') wherein each of R and R'comprises a carbon atom. Illustrative families and organic peroxide compounds include peroxy esters (e.g. t-butylperbenzoate), peroxydicarbonates (e.g. di-2-ethylhexyl peroxydicarbonate), dialkyl peroxides (e.g. di-t-butyl peroxides), hydroperoxides (e.g. t-butyl hydroperoxide) and peroxyketals (e.g. 1,1'di(t-butyl peroxy)-3,3,5-trimethylcyclohexane).

The substituted or unsubstituted olefinic unsaturated reactants that may be employed in the hydroformylation process include both optically active (prochiral and chiral) and non-optically active (achiral) olefinic unsaturated compounds containing from 2 to 40, preferably 3 to 20, carbon atoms. These compounds are described in detail in U.S. Pat. No. 7,863,487. Such olefinic unsaturated compounds can be terminally or internally unsaturated and be of straight-chain, branched chain or cyclic structures, as well as olefin mixtures, such as obtained from the oligomerization of propene, butene, isobutene, etc. (such as so called dimeric, trimeric or tetrameric propylene and the like, as disclosed, for example, in U.S. Pat. Nos. 4,518,809 and 4,528,403.

Prochiral and chiral olefins useful in the asymmetric hydroformylation that can be employed to produce enantiomeric aldehyde mixtures include those represented by the formula:

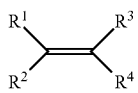

wherein $R^1$, $R^2$, $R^3$ and $R^4$ are the same or different (provided that $R^1$ is different from $R^2$ or $R^3$ is different from $R^4$) and are selected from hydrogen; alkyl; substituted alkyl, said substitution being selected from dialkylamino such as benzylamino and dibenzylamino, alkoxy such as methoxy and ethoxy, acyloxy such as acetoxy, halo, nitro, nitrile, thio, carbonyl, carboxamide, carboxaldehyde, carboxyl, and carboxylic ester; aryl including phenyl; substituted aryl including phenyl, said substitution being selected from alkyl, amino including alkylamino and dialkylamino such as benzylamino and dibenzylamino, hydroxy, alkoxy such as methoxy and ethoxy, acyloxy such as acetoxy, halo, nitrile, nitro, carboxyl, carboxaldehyde, carboxylic ester, carbonyl, and thio; acyloxy such as acetoxy; alkoxy such as methoxy and ethoxy; amino including alkylamino and dialkylamino such as benzylamino and dibenzylamino; acylamino and diacylamino such as acetylbenzylamino and diacetylamino; nitro; carbonyl; nitrile; carboxyl; carboxamide; carboxaldehyde; carboxylic ester; and alkylmercapto such as methylmercapto. It is understood that the prochiral and chiral olefins of this definition also include molecules of the above general formula where the R groups are connected to form ring compounds, e.g., 3-methyl-1-cyclohexene, and the like.

Illustrative optically active or prochiral olefinic compounds useful in asymmetric hydroformylation are described, for example, in U.S. Pat. Nos. 4,329,507, 5,360,938 and 5,491,266.

A solvent advantageously is employed in the hydroformylation process. Any suitable solvent that does not unduly interfere with the hydroformylation process can be used. By way of illustration, suitable solvents for rhodium catalyzed hydroformylation processes include those disclosed, for example, in U.S. Pat. Nos. 3,527,809; 4,148,830; 5,312,996; and 5,929,289. Non-limiting examples of suitable solvents include saturated hydrocarbons (alkanes), aromatic hydrocarbons, water, ethers, aldehydes, ketones, nitriles, alcohols, esters, and aldehyde condensation products. Specific examples of solvents include: tetraglyme, pentanes, cyclohexane, heptanes, benzene, xylene, toluene, diethyl ether, tetrahydrofuran, butyraldehyde, and benzonitrile. The organic solvent may also contain dissolved water up to the saturation limit. Illustrative preferred solvents include ketones (e.g. acetone and methylethyl ketone), esters (e.g. ethyl acetate, di-2-ethylhexyl phthalate, 2,2,4-trimethyl-1,3-pentanediol monoisobutyrate), hydrocarbons (e.g. toluene), nitrohydrocarbons (e.g., nitrobenzene), ethers (e.g., tetrahydrofuran (THF)) and sulfolane. In rhodium catalyzed hydroformylation processes, it may be preferred to employ, as a primary solvent, aldehyde compounds corresponding to the aldehyde products desired to be produced and/or higher boiling aldehyde liquid condensation by-products, for example, as might be produced in situ during the hydroformylation process, as described for example in U.S. Pat. Nos. 4,148,830 and 4,247,486. The primary solvent will normally eventually comprise both aldehyde products and higher boiling aldehyde liquid condensation by-products ("heavies"), due to the nature of the continuous process. The amount of solvent is not especially critical and need only be sufficient to provide the reaction medium with the desired amount of transition metal concentration. Typically, the amount of solvent ranges from about 5 percent to about 95 percent by weight, based on the total weight of the reaction fluid. Mixtures of solvents may be employed.

In general, metal-polyphosphoramidite catalysts may be preformed or formed in situ and comprise a metal precursor in combination with a polyphosphoramidite ligand, carbon monoxide and optionally hydrogen. The catalyst complex may be present in mononuclear, dinuclear and/or higher nuclearity forms. However, the exact structure of the catalyst is not known.

The metal-polyphosphoramidite ligand complex catalyst can be optically active or non-optically active. The metals can include Group 8, 9 and 10 metals selected from rhodium (Rh), cobalt (Co), iridium (Ir), ruthenium (Ru), iron (Fe), nickel (Ni), palladium (Pd), platinum (Pt), osmium (Os) and mixtures thereof, with the preferred metals being rhodium, cobalt, iridium and ruthenium, more preferably rhodium, cobalt and ruthenium, especially rhodium. Mixtures of these metals may be used. The permissible polyphosphoramidite ligands that make up the metal-polyphosphoramidite ligand complexes and free polyphosphoramidite ligand include tri-, tetra-, and higher polyorganophosphorus compounds. Mixtures of ligands may be employed in the metal-polyphosphoramidite ligand complex catalyst and/or free ligand, and such mixtures may be the same or different.

The polyphosphoramidite ligands that may serve as the ligand of the invention may be comprised of Formula I, II, III, or IV:

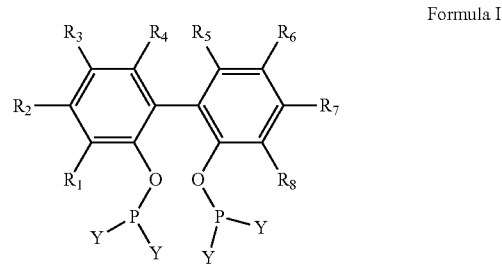

Formula I

-continued

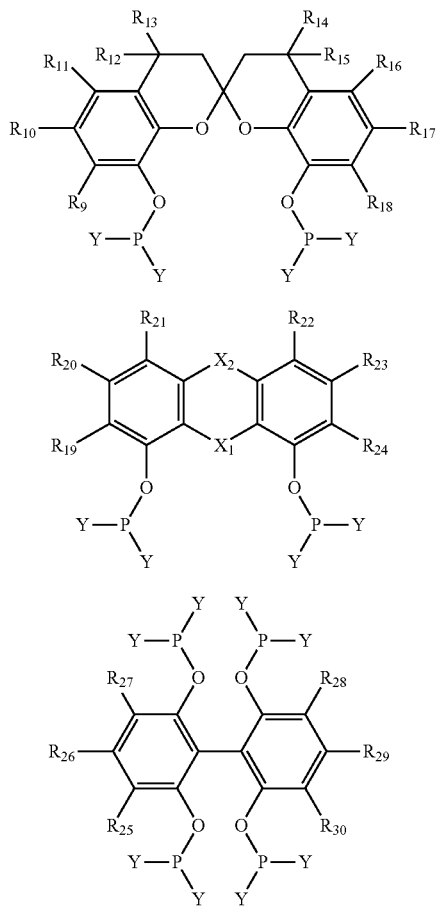

Formula II

Formula III

Formula IV in which each O and P are oxygen and phosphorous atoms respectively; each $R_1$-$R_{30}$ are independently a hydrogen, a hydrocarbyl group, an aromatic ring, a heteroaromatic ring or a halogen atom, or a heterocarbyl group selected from the groups consisting of $NR_2$, OR and SR, where R is a hydrocarbyl group of C1 to C20, or heterohydrocarbyl group having 1 to 20 atoms, each independently selected from C or a heteroatom, wherein each heteroatom is independently O, S, Si, Ge, P, or N, and may themselves be substituted or unsubstituted as required by the valency of the heteroatom. $R_1$ to $R_{24}$ may optionally comprise cycloalkyl or aryl groups fused to the biaryl moiety such as:

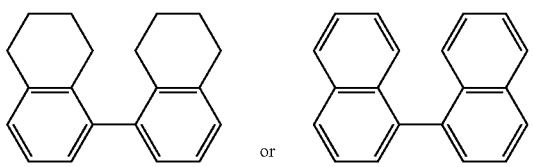

or

For Formula I, II, III, or IV each aryl, heteroaryl, hydrocarbyl, heterohydrocarbyl, hydrocarbylene, and heterohydrocarbylene group independently is unsubstituted or substituted with one or more substituents $R^v$. Each $R^v$ independently is a halogen atom, polyfluoroalkyl substitution, unsubstituted C1 to C18 alkyl, $F_3C-$, $FCH_2O-$, $F_2HCO-$, $F_3CO-$, $R_3Si$, $R_3Ge$, RO, RS, RS(O), $RS(O)_2$, $R_2P$, $R_2N$, $R_2C=N$, NC, RC(O)O, ROC(O), RC(O)N(R), or $R_2NC(O)$, or two of the $R^v$ are taken together to form an unsubstituted C1 to C18 alkylene, wherein each R independently is an unsubstituted C1 to C18 alkyl. Optionally, two of the $R^v$ are taken together to form a ring, where the ring can be cyclic or polycyclic.

For Formula III, $X_1$ is $CH_2$ or O, while $X_2$ is O or $C(R_{25})_2$, and each $R_{25}$ may be the same or different and is a hydrogen, a cycloaliphatic group, an aromatic ring, a heteroaromatic ring or a halogen atom, or a heterocarbyl group selected from the groups consisting of $NR_2$, OR and SR, where R is a hydrocarbyl group of $C_1$ to $C_{20}$, or heterohydrocarbyl group having 1 to 20 atoms, each independently selected from C or a heteroatom, wherein each heteroatom is independently O, S, Si, Ge, P, or N, and may themselves be substituted or unsubstituted as required by the valency of the heteroatom. Two $R_{25}$ groups may combine in a fused ring. Y is a an aromatic ring or a heteroaromatic ring, and may be substituted or unsubstituted.

In some embodiments, instead of including both $X_1$ and $X_2$, Formula III may include only one of $X_1$ and $X_2$, but not both. In such embodiments, when only one of $X_1$ or $X_2$ is present, the carbon valences are satisfied by hydrogen.

Each Y is the same or different and is an indolyl or pyrrolyl group bound via the nitrogen atom to phosphorus, such as:

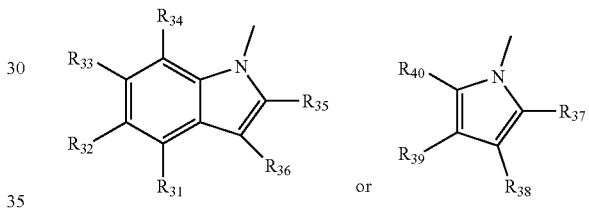

where each of $R_{31}$-$R_{40}$ are the same or different and may be a hydrogen, a hydrocarbyl group, an aromatic ring, a heteroaromatic ring or a halogen atom.

In one embodiment the metal-polyphosphoramidite catalyst is a composition comprising rhodium and at least one polyphosphoramidite ligand of Formula I, II, III or IV. In some embodiments, the catalyst treated using processes of the present invention comprises rhodium complexed with a polyphosphoramidite ligand; the rhodium complex may additionally contain any or all of olefin, hydrogen, and carbon monoxide. For example, the resting state of a catalyst may comprise the rhodium-ligand dicarbonyl hydride complex.

In absolute terms the rhodium concentration in the liquid body can range from about 25 ppm to about 1200 ppm of rhodium calculated as free metal. Analytical techniques for measuring rhodium concentration are well known to the skilled person, and include atomic absorption (AA), inductively coupled plasma (ICP) and X-ray fluorescence (XRF); AA is typically preferred. The polyphosphoramidite is present in the range of about 0.1 percent to about 1 percent by weight, based on the weight of the total reaction mixture, and in an amount sufficient to provide at least 0.1 moles of free polyphosphoramidite per mole of rhodium.

In general, the optimum catalyst concentration will depend on the olefin substrate employed. For example, it is well known that the hydroformylation rate for internal and branched internal olefins is slower than for linear alpha olefins, thus more catalyst will be required to achieve the desired conversion in those cases. For industrial processes, economic considerations require that the olefin conversion be as high as practical, thus engineering designs and process parameters—including catalyst concentration—must be adjusted accordingly.

The metal-polyphosphoramidite ligand complex catalysts may be in homogeneous or heterogeneous form. For instance, preformed rhodium hydrido-carbonyl-polyphosphoramidite ligand catalysts may be prepared and introduced into a hydroformylation reaction mixture. More preferably, the rhodium-polyphosphoramidite ligand complex catalysts can be derived from a rhodium catalyst precursor that may be introduced into the reaction medium for in situ formation of the active catalyst. For example, rhodium catalyst precursors such as rhodium dicarbonyl acetylacetonate, $Rh_2O_3$, $Rh_4(CO)_{12}$, $Rh_6(CO)_{16}$, $Rh(NO_3)_3$ and the like may be introduced into the reaction mixture along with the polyphosphoramidite ligand for the in situ formation of the active catalyst. In a preferred embodiment, rhodium dicarbonyl acetylacetonate is employed as a rhodium precursor and reacted in the presence of a solvent with the polyphosphoramidite ligand to form a catalytic rhodium-polyphosphoramidite ligand complex precursor that is introduced into the reactor along with excess (free) polyphosphoramidite ligand for the in situ formation of the active catalyst. In any event, it is sufficient that carbon monoxide, hydrogen and the polyphosphoramidite ligand are all ligands that are capable of being complexed with the metal and that an active metal-polyphosphoramidite ligand catalyst is present in the reaction mixture under the conditions used in the hydroformylation reaction. Carbonyl, hydride, and polyphosphoramidite ligands may be complexed to the rhodium either prior to or in situ during the hydroformylation process.

The catalyst precursor composition can be prepared by forming a solution of rhodium dicarbonyl acetylacetonate, an organic solvent and a polyphosphoramidite ligand. The polyphosphoramidite ligand readily replaces at least one of the carbonyl ligands of the rhodium acetylacetonate complex precursor as witnessed by the evolution of carbon monoxide gas.

Accordingly, the metal-organophosphorus ligand complex catalyst advantageously comprise the metal complexed with carbon monoxide and a polyphosphoramidite ligand, said ligand being bonded (complexed) to the metal in a chelated and/or non-chelated fashion.

In addition to the metal-polyphosphoramidite ligand complex catalyst, free polyphosphoramidite ligand (i.e., ligand that is not complexed with the metal) may also be present in the reaction medium. The significance of free ligand is taught in U.S. Pat. No. 3,527,809, GB 1,338,225, and Brown et al., "Homogeneous Hydroformylation of Alkenes with Hydridocarbonyltris(triphenylphosphine)rhodium(I) as Catalyst," *Journal of the Chemical Society*, 1970, pages 2759 and 2761. The free polyphosphoramidite ligand may correspond to any of the above-defined polyphosphoramidite ligands discussed above. It is preferred that the free polyphosphoramidite ligand be the same as the polyphosphoramidite ligand of the metal-polyphosphoramidite ligand complex catalyst employed. However, such ligands need not be the same in any given process. The hydroformylation process of this invention may involve from 0.1 moles or less to 10 moles or higher of free polyphosphoramidite ligand per mole of metal in the reaction medium. In some embodiments, the hydroformylation process is carried out in the presence of from 1 to 5 moles of polyphosphoramidite ligand per mole of metal present in the reaction medium. In some embodiments, for polyphosphoramidite ligand, from 1 to 3 moles of polyphosphoramidite ligand are employed per mole of metal. Said amounts of polyphosphoramidite ligand are the sum of both the amount of polyphosphoramidite ligand that is bound (complexed) to the metal present and the amount of free polyphosphoramidite ligand present. If desired, additional polyphosphoramidite ligand can be supplied to the reaction medium of the hydroformylation process at any time and in any suitable manner, e.g. to maintain a predetermined level of free ligand in the reaction medium.

The hydroformylation process, and conditions for its operation, are well known. The hydroformylation processes may be asymmetric or non-asymmetric, the preferred processes being non-asymmetric, and may be conducted in any batch, continuous or semi-continuous fashion and may involve any catalyst liquid and/or gas recycle operation desired. Thus, it should be clear that the particular hydroformylation process for producing such aldehydes from an olefinic unsaturated compound, as well as the reaction conditions and ingredients of the hydroformylation process are not critical features of this invention other than the polyphosphoramide ligand employed in the process.

The recycle procedure generally involves withdrawing a portion of the liquid reaction medium containing the catalyst and aldehyde product from the hydroformylation reactor, i.e., reaction zone, either continuously or intermittently, and recovering the aldehyde product in a separation zone. The separation zone may comprise the use of a composite membrane, such as disclosed in U.S. Pat. Nos. 5,430,194 and 5,681,473, or by the more conventional and preferred method of distilling it, i.e. vaporization separation, in one or more stages under normal, reduced or elevated pressure, as appropriate, in a separate distillation zone ("vaporizer"), the non-volatilized metal catalyst containing residue ("vaporizer tails") being recycled to the reaction zone as disclosed, for example, in U.S. Pat. No. 5,288,918. Condensation of the volatilized materials, and separation and further recovery thereof, e.g., by further distillation, can be carried out in any conventional manner, the crude aldehyde product can be passed on for further purification and isomer separation, if desired, and any recovered reactants, e.g., olefinic starting material and syngas, can be recycled in any desired manner to the hydroformylation zone (reactor). The recovered metal catalyst containing raffinate of such membrane separation or recovered non-volatilized metal catalyst containing residue of such vaporization separation can be recycled, to the hydroformylation zone (reactor) in any conventional manner desired.

In one embodiment, the hydroformylation reaction fluid includes any fluid derived from any corresponding hydroformylation process that contains at least some amount of four different main ingredients or components, i.e., the aldehyde product, a metal-polyphosphoramidite ligand complex catalyst, free polyphosphoramidite ligand and a solvent for said catalyst and said free ligand. The hydroformylation reaction mixture compositions can and normally will contain additional ingredients such as those that have either been deliberately employed in the hydroformylation process or formed in situ during said process. Examples of such additional ingredients include unreacted olefin starting material, carbon monoxide and hydrogen gases, and in situ formed by-products, such as saturated hydrocarbons and/or unreacted isomerized olefins corresponding to the olefin starting materials, ligand degradation compounds, and high boiling liquid aldehyde condensation by-products, as well as other inert co-solvent type materials or hydrocarbon additives, if employed.

The reaction conditions of the hydroformylation process may include any suitable type hydroformylation conditions heretofore employed for producing optically active and/or non-optically active aldehydes. The hydroformylation reaction conditions employed will be governed by the type of aldehyde product desired. For instance, the total gas pressure of hydrogen, carbon monoxide and olefin starting compound of the hydroformylation process may range from 1 to 69,000 kPa. In general, however, it is preferred that the process be operated at a total gas pressure of hydrogen, carbon monoxide and olefin starting compound of less than 14,000 kPa and more preferably less than 3,400 kPa. The minimum total pressure is limited predominantly by the amount of reactants necessary to obtain a desired rate of reaction. More specifically, the carbon monoxide partial pressure of the hydroformylation process is preferably from 1 to 6,900 kPa, and more preferably from 21 to 5,500 kPa, while the hydrogen partial pressure is preferably from 34 to 3,400 kPa and more preferably from 69 to 2,100 kPa. In general, the molar ratio of gaseous $H_2$:CO may range from 1:10 to 100:1 or higher, the more preferred molar ratio being from 1:10 to 10:1.

In general, the hydroformylation process may be conducted at any operable reaction temperature. Advantageously, the hydroformylation process is conducted at a reaction temperature from −25° C. to 200° C., preferably from 50° C. to 120° C.

The hydroformylation process may be carried out using equipment and systems known to those of skill in the art. Examples of such equipment and systems can be found in U.S. Pat. Nos. 4,247,486, 5,105,018, 5,367,106, 6,642,420, 7,446,231, 8,389,774, 8,404,903 and 9,067,876, and in PCT Publication Nos. WO2015/047723, WO2015/094781, which are hereby incorporated by reference.

In one embodiment, the hydroformylation process useful in this invention may be carried out in a multistaged reactor such as described, for example, in U.S. Pat. No. 5,728,893. Such multistaged reactors can be designed with internal, physical barriers that create more than one theoretical reactive stage per vessel.

It is generally preferred to carry out the hydroformylation process in a continuous manner Continuous hydroformylation processes are well known in the art. The continuous process can be carried out in a single pass mode, i.e., wherein a vaporous mixture comprising unreacted olefinic starting material(s) and vaporized aldehyde product is removed from the liquid reaction mixture from whence the aldehyde product is recovered and make-up olefinic starting material(s), carbon monoxide and hydrogen are supplied to the liquid reaction medium for the next single pass through without recycling the unreacted olefinic starting material(s). Such types of recycle procedure are well known in the art and may involve the liquid recycling of the metal-polyphosphoramidite complex catalyst fluid separated from the desired aldehyde reaction product(s), such as disclosed, for example, in U.S. Pat. No. 4,148,830 or a gas recycle procedure such as disclosed, for example, in U.S. Pat. No. 4,247,486, as well as a combination of both a liquid and gas recycle procedure if desired. The most preferred hydroformylation process comprises a continuous liquid catalyst recycle process. Suitable liquid catalyst recycle procedures are disclosed, for example, in U.S. Pat. Nos. 4,668,651; 4,774,361; 5,102,505 and 5,110,990.

In one embodiment, the aldehyde product mixtures may be separated from the other components of the crude reaction mixtures in which the aldehyde mixtures are produced by any suitable method such as, for example, solvent extraction, crystallization, distillation, vaporization, wiped film evaporation, falling film evaporation, phase separation, filtration, or any combination thereof. It may be desired to remove the aldehyde products from the crude reaction mixture as they are formed through the use of trapping agents as described in WO 88/08835. One method for separating the aldehyde mixtures from the other components of the crude reaction mixtures is by membrane separation, which is described, for example, in U.S. Pat. Nos. 5,430,194 and 5,681,473.

As indicated above, desired aldehydes may be recovered from the reaction mixtures. For example, the recovery techniques disclosed in U.S. Pat. Nos. 4,148,830 and 4,247,486 can be used. For instance, in a continuous liquid catalyst recycle process the portion of the liquid reaction mixture (containing aldehyde product, catalyst, etc.), i.e., reaction fluid, removed from the reaction zone can be passed to a separation zone, e.g., vaporizer/separator, wherein the desired aldehyde product can be separated via distillation, in one or more stages, under normal, reduced or elevated pressure, from the liquid reaction fluid, condensed and collected in a product receiver, and further purified if desired. The remaining non-volatilized catalyst containing liquid effluent may then be recycled back to the reactor as may if desired any other volatile materials, e.g., unreacted olefin, together with any hydrogen and carbon monoxide dissolved in the liquid reaction after separation thereof from the condensed aldehyde product, e.g., by distillation in any conventional manner. In general, it is preferred to separate the desired aldehydes from the catalyst-containing reaction mixture under reduced pressure and at low temperatures so as to avoid possible degradation of the polyphosphoramidite ligand and reaction products.

More particularly, distillation and separation of the desired aldehyde product from the metal-polyphosphoramidite complex catalyst containing reaction fluid may take place at any suitable temperature desired. In general, it is preferred that such distillation take place at relatively low temperatures, such as below 150° C., and more preferably at a temperature in the range of from 50° C. to 140° C. It is also generally preferred that such aldehyde distillation take place under reduced pressure, e.g., a total gas pressure that is substantially lower than the total gas pressure employed during hydroformylation when low boiling aldehydes (e.g., $C_4$ to $C_6$) are involved or under vacuum when high boiling aldehydes (e.g. $C_7$ or greater) are involved. For instance, a common practice is to subject the liquid reaction product medium removed from the hydroformylation reactor to a pressure reduction so as to volatilize a substantial portion of the unreacted gases dissolved in the liquid medium that now contains a much lower synthesis gas concentration than is present in the reaction medium to the distillation zone, e.g. vaporizer/separator, wherein the desired aldehyde product is distilled. In general, distillation pressures ranging from vacuum pressures on up to total gas pressure of 340 kPa should be sufficient for most purposes.

In some embodiments, the process of the invention may be employed on a continuous basis to slow or mitigate catalyst deactivation. For example, the catalyst-containing liquid effluent from the separation zone may be passed through an extraction zone comprising a dilute, aqueous solution of peroxide. In such an embodiment the concentration of peroxide in the aqueous solution is not critical, but in general, a 0.0001 to 1.0 molar solution may be employed; in another embodiment, a 0.001 to 0.5 molar solution of peroxide is employed.

In some embodiments, the process of the invention may be employed to enhance the performance of a partially deactivated catalyst. For example, once the hydroformylation process is no longer capable of meeting production targets due to a decline in catalyst activity, the catalyst solution can be rejuvenated using embodiments of the present invention comprising contacting the deactivated catalyst solution with a peroxide and then optionally the addition of fresh polyphosphoramidite ligand.

In some embodiments, the process of the invention may be conducted within the running hydroformylation process. For example, dilute peroxide solution is added directly to one or more reaction zones.

In general, the molar equivalents of peroxide to be added should be less than the molar equivalents of polyphosphoramidite ligand. In commercial hydroformylation processes, the concentration of the ligand employed and many of its associated decomposition products are routinely determined through at least one analytical method, including but not limited to $^{31}$P NMR and high performance liquid chromatograph (HPLC). Due to simplicity of operation, HPLC is typically preferred. In one embodiment, once the concentration of polyphosphoramidite ligand is known, an appropriate amount of peroxide may be added. For example, in one embodiment, a molar equivalent of peroxide which is less than the molar equivalent of polyphosphoramidite ligand in the hydroformylation process as determined by HPLC is added to the reaction zone. Based on the post-treatment catalyst performance, additional peroxide may be added if desired.

The present invention is tolerant of slight variations, and as such basing the amount of peroxide to be added on the molar equivalents of polyphosphoramidite ligand is a suitable means of carrying out the invention.

Following the peroxide treatment, fresh polyphosphoramidite ligand may be added if desired so as to achieve or maintain a polyphosphoramidite ligand concentration of 1-10 moles of ligand per mole rhodium; preferably 1-5 moles per rhodium; most preferably 1.2-3 moles per rhodium. Polyphosphoramidite ligand concentration should be determined by HPLC, rhodium content should be determined by atomic absorption (AA), and additional ligand can be added as necessary to maintain the desired concentration.

Illustrative non-optically active aldehyde products include e.g., propionaldehyde, n-butyraldehyde, isobutyraldehyde, n-valeraldehyde, 2-methyl 1-butyraldehyde, hexanal, hydroxyhexanal, 2-methyl 1-heptanal, nonanal, 2-methyl-1-octanal, decanal, adipaldehyde, 2-methylglutaraldehyde, 2-methyladipaldehyde, 3-hydroxypropionaldehyde, 6-hydroxyhexanal, alkenals, e.g., 2-, 3- and 4-pentenal, alkyl 5-formylvalerate, 2-methyl-1-nonanal, 2-methyl 1-decanal, 3-propyl-1-undecanal, pentadecanal, 3-propyl-1-hexadecanal, eicosanal, 2-methyl-1-tricosanal, pentacosanal, 2-methyl-1-tetracosanal, nonacosanal, 2-methyl-1-octacosanal, hentriacontanal, and 2-methyl-1-triacontanal.

Illustrative optically active aldehyde products include (enantiomeric) aldehyde compounds prepared by the asymmetric hydroformylation process of this invention such as, e.g. S-2-(p-isobutylphenyl)-propionaldehyde, S-2-(6-methoxy-2-naphthyl)propionaldehyde, S-2-(3-benzoylphenyl)-propionaldehyde, S-2-(3-fluoro-4-phenyl)phenylpropionaldehyde, S-2-(2-methylacetaldehyde)-5-benzoylthiophene and the like.

Some embodiments of the present invention will now be described in the following Examples.

EXAMPLES

All parts and percentages in the following examples are by weight unless otherwise indicated. Pressures are given as absolute pressure unless otherwise indicated. Solutions of t-butyl hydroperoxide in water (70 wt %) and hydrogen peroxide (30 wt % in water) are purchased from Aldrich and additionally diluted with deionized water. Ligand A is used in these Examples.

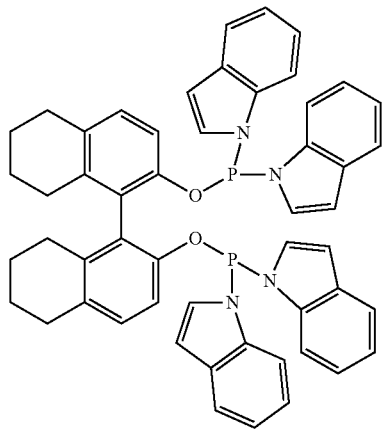

Ligand A

General Procedure

Hydroformylation Test Unit description—A liquid recycle reactor system that consists of a 1 liter stainless steel stirred tank reactor equipped with a vertically mounted agitator and a circular tubular sparger located near the bottom of the reactor. The sparger contains a plurality of holes of sufficient size to provide the desired gas flow into the liquid body in the reactor. The sparger is used for feeding the olefin and/or syngas to the reactor, and can also be used to recycle unreacted gases. The reactor has a silicone oil shell as a means of controlling reactor temperature. The reactor also contains a pneumatic liquid level controller for maintaining the desired liquid level and a blow-off vent for removal of unreacted gases. A portion of the liquid reaction solution is continuously pumped to a vaporizer, which consists of a heated vessel at reduced pressure. The effluent stream from the vaporizer is sent to a gas-liquid separator located at the bottom of the vaporizer, where vaporized aldehyde is separated from the non-volatile components of the liquid reaction solution. The vaporized aldehyde product is condensed and collected in a product receiver. A pneumatic liquid level controller controls the desired non-volatile component level, including catalyst to be recycled, at the bottom of the separator. The rate of catalyst deactivation is calculated based on the observed increase in propylene partial pressure in the hydroformylation reactor while maintaining a constant total reactor pressure; an increase in propylene partial pressure under these conditions indicates a decline in propylene conversion.

Glass Reactor description—Hydroformylation Examples and Comparative Experiments are conducted in 90 mL flow-through Fisher Porter reactors equipped with means for accurate control of temperatures and gas flows. Mixing in the flow-through reactor is effected by continuous gas flow via a sparger at the bottom of the reactor. This reactor design is described in detail in U.S. Pat. No. 5,731,472, the teachings of which are incorporated by reference. Hydroformylation conditions are approximately 110 psia 1:1 syn gas, 10-11 psia propylene, 165 psia total pressure (balance nitrogen) at 100° C. unless otherwise indicated. Reactor off gases are analyzed by online GC to determine partial pressures and product selectivity; and to allow calculation of reaction rates using Dalton's Law. Reaction rates are expressed as the moles of aldehyde produced per volume of catalyst solution per unit time (moles/L-hour); this value is additionally divided by the propylene partial pressure to help dampen the effects of small, unavoidable fluctuations in the propylene feed rate (rate/olefin). Product selectivity is expressed as the ratio of linear (normal) aldehyde versus branched (iso) aldehyde (N:I) as well as the percentage of linear aldehyde. Aliquots of the following deactivated catalyst solution are used for some Examples:

Catalyst Solution A—Catalyst solution comprised of rhodium and Ligand A is charged to the Hydroformylation Test Unit and used for the hydroformylation of propylene under varying conditions for a period of time. During the course of the run the hydroformylation rate demonstrated by the catalyst declines to approximately 50% of a fresh rhodium-Ligand A catalyst under comparable concentrations and reaction conditions. Total phosphorous content is determined by XRF (0.0038M).

Peroxide concentration is expressed as the molar concentration in the catalyst solution.

Comparative Experiment B and Examples 2-4

Catalyst solution A (20 mL) is added to each of four Glass Reactors along with 10 mL of tetraglyme; the excess butyraldehyde is stripped off at 100° C. under flowing 1:1 syn gas overnight, resulting in a solution volume of about 17 mL and a final rhodium concentration of approximately 185 ppm. Hydroformylation is initiated in each reactor and a 1 mL injection of dilute t-butylhydroperoxide solution in water is made to each of the reactors of Examples 2-4, with each reactor receiving a different concentration of t-butylhydroperoxide solution as indicated below in Table 2; 1 mL of deionized water is injected into the reactor of Comparative Experiment B. After 24 hours of operation, additional and comparable injections of peroxide solutions are made to each of the reactors of Examples 2-4, and an additional 1 mL of deionized water is added to the reactor of Comparative Experiment B. No additional Ligand A is added to any of the reactors. The resulting catalyst performance is summarized in Table 2.

TABLE 2

| | Comparative Exp B (0 peroxide) | | | Example 2 2 inj; (0.0015M peroxide) | | | Example 3 2 inj; (0.003M peroxide) | | | Example 4 2 inj; (0.006M peroxide) | | |
|---|---|---|---|---|---|---|---|---|---|---|---|---|
| Days | rate/ole | N: I | % linearald | rate/ole | N: I | % linearald | rate/ole | N: I | % linearald | rate/ole | N: I | % linearald |
| 1 | 0.1143 | 66.9 | 98.51 | 0.1477 | 65.7 | 98.48 | 0.1445 | 66.3 | 98.49 | 0.1524 | 66.0 | 98.48 |
| 2 | 0.1090 | 64.0 | 98.44 | 0.1418 | 70.1 | 98.57 | 0.1410 | 68.5 | 98.54 | 0.1427 | 68.6 | 98.54 |
| 3 | 0.1021 | 61.5 | 98.37 | 0.1389 | 66.2 | 98.49 | 0.1351 | 67.1 | 98.51 | 0.1355 | 65.2 | 98.47 |
| 4 | 0.0940 | 58.3 | 98.28 | 0.1288 | 59.9 | 98.33 | 0.1325 | 62.8 | 98.41 | 0.1353 | 62.1 | 98.39 |

Comparative Experiment A and Example 1

Catalyst solution A (20 mL) is added to each of two LP Oxo Glass Reactors along with 10 mL of tetraglyme; the excess butyraldehyde is stripped off at 100° C. under flowing 1:1 syn gas overnight, resulting in a solution volume of about 17 mL and a final rhodium concentration of approximately 185 ppm. Hydroformylation is initiated in each reactor. After 24 hours of operation, a solution of hydrogen peroxide in water (0.3 wt %; 0.003M final peroxide concentration) is injected into the reactor of Example 4 under continuous hydroformylation conditions. After an additional 3.5 hours, a second, comparable injection of hydrogen peroxide is made to the reactor of Example 4 under hydroformylation conditions. No additional Ligand A is added to either reactor. The resulting catalyst performance is summarized in Table 1.

TABLE 1

| | Comparative Exp A (0 peroxide) | | | Example 1 2 inj on Day 2 (0.003M peroxide each inj) | | |
|---|---|---|---|---|---|---|
| Days | rate/ole | N: I | % linearald | rate/ole | N: I | % linearald |
| 1 | 0.1167 | 60.9 | 98.36 | 0.1258 | 64.4 | 98.45 |
| 2 | 0.1048 | 56.2 | 98.22 | 0.1367 | 66.9 | 98.51 |
| 3 | 0.0922 | 52.9 | 98.11 | 0.1388 | 59.8 | 98.33 |

The results of Table 1 show that the treatment of the invention can improve catalyst performance and mitigate catalyst deactivation, and moreover that the treatment can be performed under continuous hydroformylation conditions.

The results of Table 2 again show the ability to improve catalyst performance in an operating hydroformylation process with an organic peroxide using an embodiment of a process of the invention.

Comparative Experiment C and Example 5

Catalyst solution A (20 mL) is stirred at room temperature with dilute hydrogen peroxide (0.044 M final concentration) for 2 hours, after which it is charged to a Glass Reactor along with 10 mL of Tetraglyme (Example 5). A second reactor is charged with 20 mL of Catalyst Solution A and 10 mL of Tetraglyme but with out peroxide treatment (Comparative Experiment C). Ligand A (about 1.5 moles per mole of rhodium) is added to each reactor and hydroformylation is initiated. The hydroformylation rate of the treated solution (Example 5) is approximately twice that of the Comparative Experiment C.

Comparative Experiment D and Example 6

A catalyst solution comprising rhodium (170 ppm), Ligand A (about 1.2 moles per mole of rhodium), butyraldehyde and butyraldehyde heavies is charged to the Hydroformylation Test Unit and utilized for the continuous hydroformylation of propylene. The vaporizer tails stream is passed through a liquid-liquid extraction zone (vaporizer tails flow rate approximately 100 g/hr); where it is contacted with an aqueous solution comprising hydrogen peroxide (0.0128 M) and sodium phosphate (0.004 M, pH 6.8). The catalyst-containing vaporizer tails exiting the extraction zone is returned to the hydroformylation reactor. The rate of catalyst deactivation is tracked by measuring the increase in propylene partial pressure (Example 6). After 7 days, the extraction zone is bypassed and the vaporizer tails stream is returned directly to the hydroformylation reactor without contacting the aqueous extractor solution; the rate of catalyst deactivation is again measured for 7 days (Comparative Experiment D). The resulting catalyst performance is summarized in Table 3.

TABLE 3

| Comparative Exp D (No Extractor) | Example 6 (Aqueous Hydrogen Peroxide in Extractor) |
|---|---|
| Catalyst Deactivation Rate (increase in propylene; psia/day) 1.9 | Catalyst Deactivation Rate (increase in propylene; psia/day) 0.8 |

The results of Table 3 show the ability to significantly slow the rate of catalyst deactivation as measured by the increase in propylene partial pressure from 1.9 psia per day (Comparative Experiment D) down to 0.8 psia per day (Example 6) through an embodiment of the invention. It is noted that additional Comparative Experiments were performed following the procedure of Example 6 with the exception of no peroxide being added; in those cases the rate of catalyst deactivation was unchanged by contacting the vaporizer tails with an aqueous sodium phosphate solution.

Taken collectively, the results presented herein demonstrate that the rate of deactivation demonstrated by a hydroformylation catalyst comprised of rhodium, polyphosphoramidite and polyphosphoramidite degradation products can be greatly reduced, and moreover that the performance of an aged and deactivated hydroformylation catalyst of like composition can be greatly improved via embodiments of processes of the invention.

What is claimed is:

1. A method of treating a hydroformylation catalyst solution comprising rhodium, polyphosphoramidite ligand, and polyphosphoramidite ligand degradation products, wherein the hydroformylation catalyst solution is used to hydroformylate an olefin in an operating hydroformylation unit, the method comprising: contacting the catalyst solution with a peroxide in the operating hydroformylation unit.

2. The method of claim 1, wherein the operating hydroformylation unit comprises a reaction zone, and wherein the contacting comprises adding the peroxide to the reaction zone of the operating hydroformylation unit.

3. The method of claim 1, wherein the contacting comprises a) introducing a portion of the catalyst solution to a separation zone to provide a catalyst-containing liquid effluent; and b) passing at least a portion of the catalyst-containing liquid effluent from the separation zone through an extraction zone comprising an aqueous peroxide solution.

4. The method of claim 3, wherein the separation zone comprises a vaporizer.

5. The method of claim 3, further comprising returning the treated catalyst solution to a reaction zone in the operating hydroformylation unit.

6. The method of claim 1, further comprising adding additional polyphosphoramidite ligand to the operating hydroformylation unit.

7. The method of claim 1, wherein the peroxide comprises hydrogen peroxide, peroxy esters, peroxydicarbonates, dialkyl peroxides, hydroperoxides, peroxyketals, or a combination thereof.

8. The method of claim 1, wherein the temperature of the catalyst solution is 60° C. or greater when contacted with the peroxide.

9. The method of claim 1, wherein the hydroformylation catalyst solution further comprises at least one product aldehyde.

10. The method of claim 1 wherein the molar equivalent of peroxide is less than the molar equivalent of polyphosphoramidite ligand when the hydroformylation catalyst solution is contacted with the peroxide wherein the molar equivalent of polyphosphoramidite ligand is measured using high performance liquid chromatography (HPLC).

11. A method of treating a hydroformylation catalyst solution comprising rhodium, polyphosphoramidite ligand, and polyphosphoramidite ligand degradation products, wherein the hydroformylation catalyst solution is used to hydroformylate an olefin in an operating hydroformylation unit, the method comprising: contacting the catalyst solution with a peroxide in the operating hydroformylation unit, wherein the operating hydroformylation unit comprises a reaction zone and a separation zone, and wherein the catalyst solution is contacted with the peroxide in at least one of the following:
   (1) the reaction zone;
   (2) a stream on its way to the separation zone;
   (3) the separation zone;
   (4) a recycle stream returning to the reaction zone;
   (5) a fluid withdrawn from the reaction zone or the separation zone;
   (6) a fluid withdrawn from the reaction zone or the separation zone that has been treated with an aqueous buffer solution;
   (7) a fluid that has been treated with an aqueous buffer solution and being returned to the reaction zone or the separation zone; or
   (8) a fluid in an external cooler.

* * * * *